United States Patent [19]

Akachi et al.

[11] Patent Number: 5,421,067
[45] Date of Patent: Jun. 6, 1995

[54] SYNTHETIC RESIN FASTENER

[75] Inventors: Keiji Akachi; Hideyuki Hashimoto; Norio Oomori, all of Aichi, Japan

[73] Assignee: Toyoda Gosei Co., Ltd., Nishikasugai, Japan

[21] Appl. No.: 242,443

[22] Filed: May 13, 1994

[30] Foreign Application Priority Data

Jun. 16, 1993 [JP] Japan .................. 5-145179

[51] Int. Cl.$^6$ .................. F16B 21/00; A44B 17/00
[52] U.S. Cl. .................. 24/297; 24/453; 411/508
[58] Field of Search .................. 24/297, 289, 453, 563; 411/508, 510, 349

[56] References Cited

U.S. PATENT DOCUMENTS

| | | | |
|---|---|---|---|
| 3,093,874 | 6/1963 | Rapata | 24/297 |
| 4,524,494 | 6/1985 | Sato et al. | 24/453 |
| 4,701,984 | 10/1987 | Wyckoff | 24/297 |
| 4,810,147 | 3/1989 | Hirohata | 411/508 |

FOREIGN PATENT DOCUMENTS

| | | |
|---|---|---|
| 59-20016 | 2/1984 | Japan . |
| 63-119112 | 8/1988 | Japan . |
| 4296209 | 10/1992 | Japan . |

Primary Examiner—Victor N. Sakran
Attorney, Agent, or Firm—Cushman, Darby & Cushman

[57] ABSTRACT

A synthetic resin fastener for fixing a first member having a first attaching hole formed therein to a second member having a second attaching hole formed therein. The fastener includes a head portion for engagement with a surface-side peripheral edge of the first attaching hole, a seat portion extending from a rear surface of the head portion for engagement with a surface-side peripheral edge of the second attaching hole, and an anchor portion extending from a rear surface of the seat portion for engagement with a back-side peripheral edge of the second attaching hole. The anchor portion includes a pillar portion extending from the rear surface of the seat portion, a pair of engaging elastic arm portions each extending from an end portion of the pillar portion toward the seat portion, inwardly rotatable engaging levers formed at outer portions of the ends of the engaging elastic arm portions through hinge portions, and support member for preventing the engaging levers from moving to an inoperation positions the falling-down.

2 Claims, 2 Drawing Sheets

SYNTHETIC RESIN FASTENER

BACKGROUND OF THE INVENTION

The present invention relates to a synthetic resin fastener (hereinafter, referred to simply as "fastener") which is to be used in fixing a first member having a first attaching hole formed therein to a second member having a second attaching hole formed therein, and more particularly, to a fastener which is suitable for fixing a rubber weather strip for automobile (first member) to a car body sheet metal (second member).

A synthetic resin fastener has been proposed in Japanese Utility Model Unexamined Publication Nos. 59-20016 and 63-119112 and Japanese Patent Unexamined Publication No. 4-296209.

As shown in FIG. 1, the conventional fastener comprises a head portion 21 which is to be engaged with a surface-side peripheral edge of a first attaching hole 15 (the edge located on the side from which a fastener is inserted), a seat portion 25 extending from a rear surface of the head portion 21 through a neck portion 23 so as to be brought into engagement with a surface-side peripheral edge of a second attaching hole 19, and an anchor portion 27 extending from a rear surface of the seat portion 25 so as to be brought into engagement with a back-side peripheral edge of the second attaching hole 19. The anchor portion 27 comprises a pillar portion 29 extending from the rear surface of the seat portion 25 and a pair of engaging elastic am portions 33 each extending from the tip end portion of the pillar portion 29 towards the seat portion 23 and having an engaging pawl portion 31 formed at the tip end thereof.

When fixing a weather strip to sheet metal 13 of a car body, it has been customary that the first attaching hole 15 is formed in the weather strip 11, the fastener 17 is attached to the weather strip 11 through the first attaching hole 15, and then the fastener 17 is inserted into the second attaching hole 19 formed in the car body sheet metal 13 (see FIGS. 1~2).

Recently, changes have been made in the plate thickness of the structure of the car body sheet metal (double-ply flange, triple-ply flange and so on) and, further, in order to improve productivity, the allowable tolerances of plate thickness have increased. For this reason, when using a fastener having the above-described construction, it is necessary to prepare two or more kinds of fasteners which have engaging elastic arm portions 33 corresponding to various plate thicknesses. The reason for requiring different kinds of fasteners is that, when applying a synthetic resin fastener 17 which is suitable for car body sheet metal having a large thickness 13 as shown in FIG. 1 in a car body sheet metal having a small thickness 13A as shown in FIG. 2, the engaging pawl portion 31 of the engaging elastic arm portion 33 cannot be engaged with the back surface surrounding the second attaching hole 19, resulting in the occurrence of play.

Further, it is not advisable to use two or more kinds of fasteners in fixing the same weather strip due to the increased risk of misassembly.

In view of the above-described problems, an object of the present invention is to provide a synthetic resin fastener which is adapted to be cooperable with a second member having a variation in plate thickness.

SUMMARY OF THE INVENTION

A synthetic resin fastener is provided in accordance with the principles of the present invention which may be used in fixing a first member having a first attaching hole formed therein to a second member having a second attaching hole formed therein. The fastener comprises a head portion for engagement with a surface-side peripheral edge of the first attaching hole, a seat portion extending from a rear surface of the head portion through a neck portion for engagement with a surface-side peripheral edge of the second attaching hole, and an anchor portion extending from a rear surface of the seat portion for engagement with a back-side peripheral edge of the second attaching hole. The anchor portion comprises a pillar portion extending from the rear surface of the seat portion, a pair of engaging elastic arm portions each extending from a tip end portion of the pillar portion towards the seat portion, inwardly rotatable engaging levers formed at outer portions of the tip end portions of the engaging elastic arm portions through hinge portions, and members for contacting the engaging levers, formed at the tip ends of the engaging elastic arm portions so as to maintain the engaging members in a supported position.

The contacting members comprise a supporting projection which is formed at the tip end portion of each of the engaging elastic arm portions so as to be located inwardly of the hinge portion, in one embodiment, while the contacting members comprises a supporting arm which is formed at a free end of each engaging lever so as to be extended inwardly, in another embodiment.

The synthetic resin fastener according to the present invention has the following functions and effects due to the above-described structure thereof.

The first member is fixed to the second member by inserting the anchor portion of the fastener attached to the first member into the second attaching hole of the second member. In this case, the engaging levers are engaged with the second attaching hole with no play at the tip end portions thereof when the plate thickness of the second member is small and at the root portions thereof when the plate thickness of the second member is large, respectively. Then, due to the provision of the supporting projections or supporting arms which serve as the contacting members, the engaging levers are supported and prevented from falling down, and accordingly, it is possible to prevent the failure of removal of the fastener which might be caused otherwise due to the excessive opening of the engaging elastic arm portions. Consequently, the variation in the plate thickness of the car body sheet metal can be accomodated and, as a result, it is possible to fasten weatherstrips to second members (car body sheet metal) with only one kind of synthetic resin fastener, even if the plate thicknesses of the second members are somewhat different.

BRIEF DESCRIPTION OF THE DRAWINGS

FIG. 1 is a sectional view showing a conventional fastener coupling a weatherstrip to a thick plate;

FIG. 2 is a sectional view showing the conventional fastener of FIG. 1 coupling a weatherstrip to a thin plate;

FIG. 3 is a front view of an embodiment of a fastener according to the present invention;

FIG. 4 is a sectional view taken along the line 4–4 in FIG. 3;

DETAILED DESCRIPTION OF PREFERRED EMBODIMENTS

Figure 5:
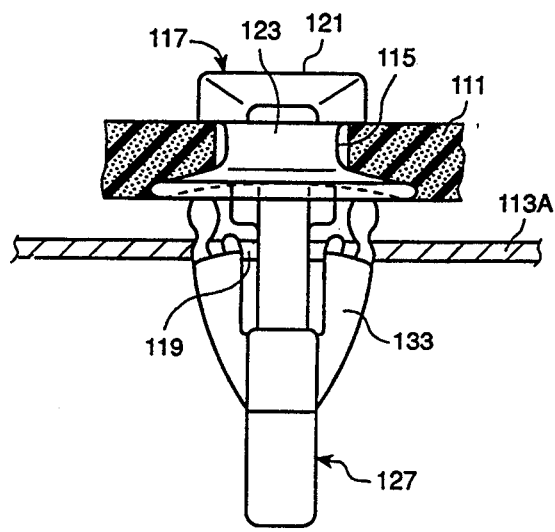
FIG. 5 is a sectional view of the fastener of FIG. 3 inserted into a car body sheet metal having a small thickness.

Description will be given below of preferred embodiments of the present invention in detail with reference to FIGS. 3 to 8.

The illustrated synthetic resin fastener 117 is preferably provided for use in fixing a weather strip (first member) 111 having a first attaching hole 115 formed therein to a car body sheet metal (second member) 113 having a second attaching hole 119 formed therein.

The synthetic resin fastener 117 comprises a head portion 121 which is adapted to be engaged with a surface-side peripheral edge of the first attaching hole 115, a seat portion 125 formed so as to extend from a rear surface of the head portion 121 through a neck portion 123 and adapted to be engaged with a surface-side peripheral edge of the second attaching hole 119, and an anchor portion 127 extending from the rear surface of the seat portion 125 so as to be used for the engagement with a back-side peripheral edge of the second attaching hole 119. The anchor portion 127 comprises a pillar portion 129 extending from the rear surface of the seat portion 125 and a pair of engaging elastic arm portions 133 each extending from the tip end portion of the pillar portion 129 towards the seat portion 125.

It is noted here that, although the head portion 121 has a bell-shaped periphery in the illustrated embodiment, the head portion may be formed arbitrarily in any shape including circular, elliptical or rectangular provided that it can be inserted in the first attaching hole 115 and can be engaged with the surface-side peripheral edge thereof. Further, the seat portion 125 has an annular shape. However, the seat portion 125 may be formed arbitrarily in any shape such as elliptical, rectangula or the like provided that the seat portion 125 can be engaged with the surface-side peripheral edge of the second attaching hole 119. The cross-sectional shape of the pillar portion 129 is rectangular, however, it may be elliptical, circular or polygonal. In addition, the engaging elastic arm portion 133 has a rectangular cross-section, but an outer peripheral edge of the tip end portion of the engaging elastic arm portion 133 may have an arcuate cross-sectional shape, the outer periphery thereof being made to extend along an outer periphery of a circle which is coaxial with that of the seat portion 125. Moreover, the shape of the seat portion 125 is not limited to that of a bevel.

Figure 8:
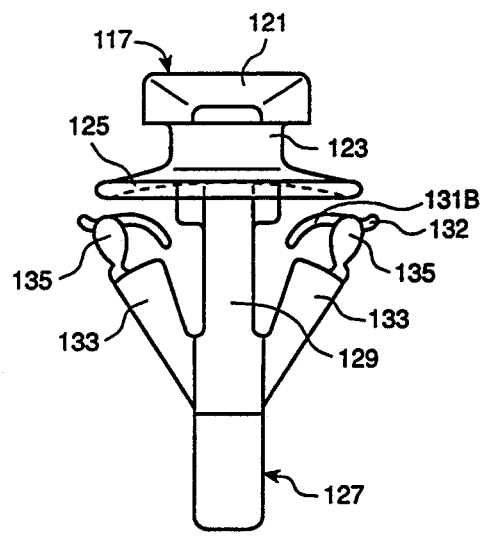
FIG. 8 is a front view of another embodiment of a fastener according to the present invention.
Figure 5:
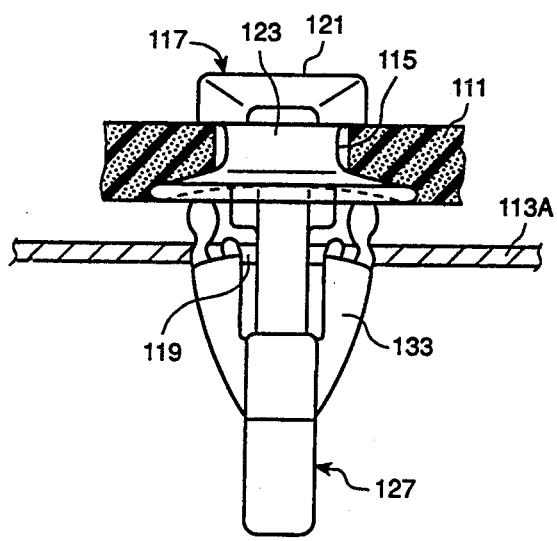
Figure 6:
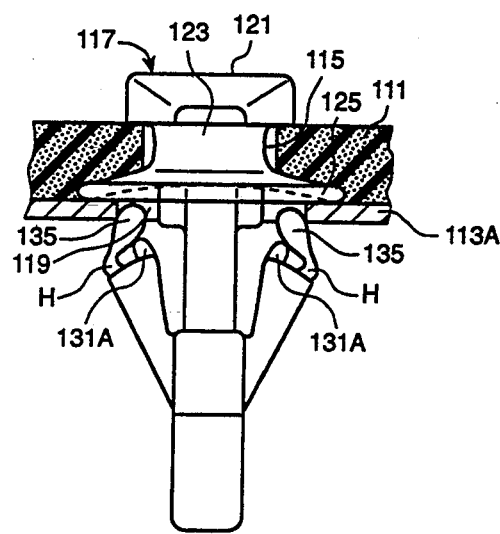
Figure 7:
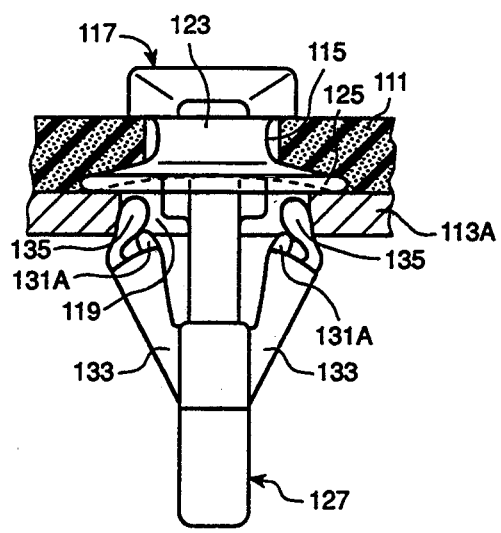
Figure 8:
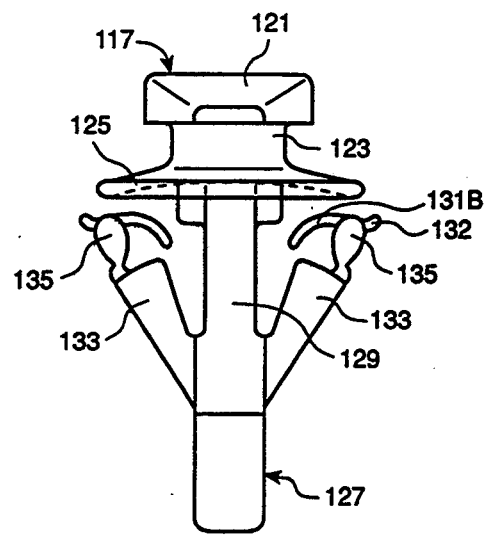

In the present embodiment, each of the engaging elastic arm portions 133 is formed at the tip end portion thereof with an inwardly rotatable engaging lever 135 thorough a hinge portion H, and a supporting projection 131A is formed on each engaging elastic arm portion 133 so as to be located inwardly of the hinge portion H, defining means for contacting the engaging lever 135 so as to assure it remains generally in a supported position (FIGS. 3 and 4). It is noted here that the supporting projection 131A is so formed as to be located in the same position as the conventional engaging pawl portion 31 (FIG. 1) and the height thereof is usually set in the range of 1~2 mm. The shape of the engaging lever 135 is not particularly limited, provided that the object of the present invention is achieved, however, it is preferable that engaging lever 135 have a section in which the thickness thereof is increased gradually towards the tip end portion thereof as illustrated in FIG. 3, because that sectional shape can accommodate the variety of the plate thickness of the second member so as to securely hold the second member in position. Further, the maximum thickness of the plate 13 in such case is usually set to be in the range of 1~2 mm. Moreover, as the contacting means, the supporting projection 131A may be replaced by an inwardly curved supporting arm 131B which is formed at the free end of the engaging lever 135 as shown in FIG. 8. Each supporting arm 131B is constructed and arranged to contact the elastic arm portion 133 upon inward rotation of the engaging lever about it hinge portion. Incidentally, in FIG. 8, although not necessary, an auxiliary supporting projection 132 is provided which contacts the back side of the car body sheet metal 113 to prevent the engaging lever 135 from falling down, assuming that the thickness of the car body sheet metal 13 is so small as to cause a deflection due to a load applied during assembly.

It is noted that the fastener is preferably made of a hard plastic such as polypropylene, polyamide or polyacetals by means of injection molding or the like.

Figure 6:
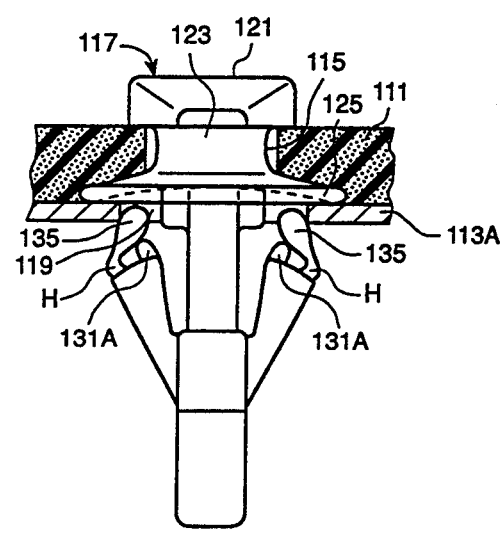
FIG. 6 is a sectional view of the fastener of FIG. 5 shown coupling the weatherstrip to the car body sheet metal.
Figure 7:
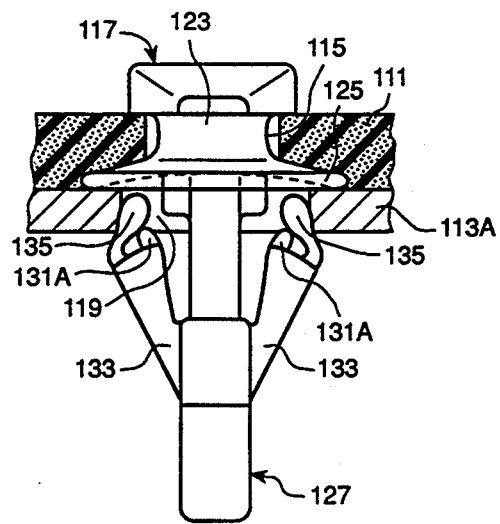
FIG. 7 is a sectional view of the fastener of FIG. 3 coupling a weatherstrip to a car body sheet metal having a large thickness.

Next, description will be given of the manner of using the above-described embodiments of the fastener 117 with reference to FIGS. 5 to 7.

The fastener 117 is attached to the weather strip 111 by inserting and engaging the head portion 121 of the fastener 117 into and with the first attaching hole 115 of the weather strip 111. Subsequently, the anchor portion 127 of the fastener 117 is inserted into the second attaching hole 119 of the car body sheet metal 113. Then, after the engaging elastic arm portions 133 of the anchor portion 127 have passed-through the second attaching hole 119 while they are forcedly bent, the engaging elastic arm portions 133 are elastically restored, resulting in that the weather strip 111 and the car body sheet metal 113 are held between the engaging levers 135 of the engaging elastic arm portions 133 and the rear surface of the head portion 121 (FIGS. 6 and 7). Further, the engaging levers 135 are each supported and prevented from falling down in an inwardly direction due to the provision of the supporting projections 131A. Accordingly, it is possible to prevent the removal of the fastener which might be caused otherwise due to the excessive opening of the engaging elastic arm portions 133.

Thus, the engaging levers 135 are engaged with the second attaching hole 119 with no play at the tip end portions thereof when the plate thickness of the car body sheet metal 113A is small (see FIG. 6) and, at the root portions thereof, when the plate thickness of the car body sheet metal 13A is large (see FIG. 7), respectively. Consequently, the variation in the plate thickness of the car body sheet metal can be accomodated and, as a result, it becomes possible to fasten weatherstrips to car body sheet metals (second member) having plate thicknesses which are somewhat different with only one kind of synthetic resin fastener.

What is claimed is:

1. A synthetic resin fastener for fixing a first member having a first attaching hole formed therein to a second member having a second attaching hole formed therein, the fastener comprising:

- a head portion constructed and arranged for engagement with a surface-side peripheral edge of the first attaching hole;
- a seat portion extending from a rear surface of said head portion and being constructed and arranged for engagement with a surface-side peripheral edge of the second attaching hole; and
- an anchor portion extending from a rear surface of said seat portion for engagement with a back-side peripheral edge of the second attaching hole,
- said anchor portion comprising a pillar portion extending from the rear surface of said seat portion; a pair of spaced engaging elastic arm portions each extending from an end portion of said pillar portion in a direction towards said seat portion; inwardly rotatable engaging levers formed at outer portions of ends of each of said engaging elastic arm portions through hinge portions, and supporting projections formed at the ends of each of said engaging elastic arm portions so as to be disposed inwardly of the associated hinge portion said supply projection being constructed and arranged to contact an associated engaging lever upon inward rotation of said engaging lever about the hinge portion thereof.

2. A synthetic resin fastener for fixing a first member having a first attaching hole formed therein to a second member having a second attaching hole formed therein, the fastener comprising:

- a head portion constructed and arranged for engagement with a surface-side peripheral edge of the first attaching hole;
- a seat portion extending from a rear surface of said head portion and being constructed and arranged for engagement with a surface-side peripheral edge of the second attaching hole; and
- an anchor portion extending from a rear surface of said seat portion for engagement with a back-side peripheral edge of the second attaching hole,
- said anchor portion comprising a pillar portion extending from the rear surface of said seat portion; a pair of spaced engaging elastic arm portions each extending from an end portion of said pillar portion in a direction towards said seat portion; inwardly rotatable engaging levers formed at outer portions of ends of each of said engaging elastic arm portions through hinge portions, and supporting arms formed at free ends of said engaging levers so as to be extended inwardly towards said pillar portion, each of said engaging levers being constructed and arranged to contact a portion of said pillar portion upon inward rotation of said engaging lever about its hinge portion.

* * * * *